A. C. EGGERS.

Assignor, by direct and mesne assignments, to the IDEAL RUBBER COMPANY.

NURSING BOTTLE NIPPLE.

No. 11,087. Reissued June 17, 1890.

WITNESSES:

Fol. W. Rosenbaum.

Martin Petry

INVENTOR:

Anton C. Eggers

BY

Goepel & Raymond

ATTORNEYS.

UNITED STATES PATENT OFFICE.

ANTON C. EGGERS, OF BROOKLYN, NEW YORK, ASSIGNOR, BY DIRECT AND MESNE ASSIGNMENTS, TO THE IDEAL RUBBER COMPANY, OF SAME PLACE.

NURSING-BOTTLE NIPPLE.

SPECIFICATION forming part of Reissued Letters Patent No. 11,087, dated June 17, 1890.

Original No. 411,794, dated October 1, 1889. Application for reissue filed April 29, 1890. Serial No. 349,968.

*To all whom it may concern:*

Be it known that I, ANTON C. EGGERS, of Brooklyn, in the county of Kings and State of New York, have invented certain new and useful Improvements in Nursing-Bottle Nipples; and I do hereby declare the following to be a full, clear, and exact description of the invention, that will enable others skilled in the art to which it appertains to make and use the same.

This invention relates to an improved nipple for nursing-bottles by which atmospheric air is admitted to the interior of the bottle while the same is used by infants for drinking, so that the partial vacuum formed in the bottle is destroyed and the use of the bottle for drinking facilitated; and the invention consists of a nipple for nursing-bottles which is provided with an exterior elastic cap and a guard-shield above said cap, said guard-shield being provided with a vent-channel passing radially through said shield, and with a valve at the inner end of the same, said valve and guard-shield being made integral with the nipple, as will be fully described hereinafter, and finally be pointed out in the claims.

Figure 1:
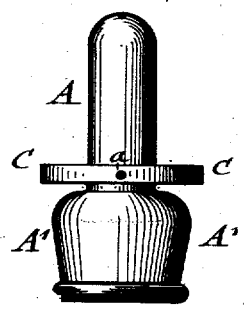
Figure 2:
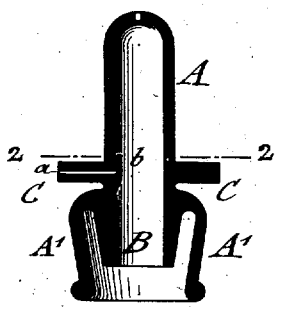
Figure 3:
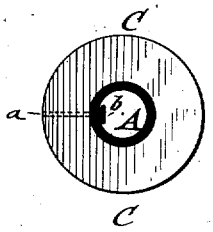

In the accompanying drawings, Figure 1 represents a side elevation of my improved nipple for nursing-bottles. Fig. 2 is a vertical central section of the same; and Fig. 3 is a horizontal section on the line 2 2, Fig. 2.

Similar letters of reference indicate corresponding parts.

In the drawings, A represents a nipple of soft rubber, which is provided with an elastic cap A′ and an interior tubular stopper B, that fits on the mouth of the nursing-bottle, so as to tightly close the same in connection with the exterior cap A′. Above the cap A′ of the nipple is arranged a guard-shield C, which is made integral with the nipple. A vent-channel *a* extends radially through the guard-shield C, and is provided at its inner end with a flap-valve or tongue *b*, that closes the vent-channel *a* when no external pressure is exerted on the same, while it opens the vent-channel whenever, by the partial vacuum formed in the bottle, the pressure of the atmosphere opens the same. The vent-channel *a* is open, communicates with the atmosphere at its outer end, and is molded into the guard-shield while the nipple is in the course of manufacture. The vent which is thus given to the interior of the bottle destroys the vacuum formed in the same by the gradual withdrawing of the liquid, and facilitates thereby the drinking of the contents of the bottle by the infant.

Having thus described my invention, I claim as new and desire to secure by Letters Patent—

1. A nipple for nursing-bottles, provided with an elastic cap and a guard-shield above the same, said guard-shield being made integral with the nipple and provided with a vent-channel and with a valve at the inner end of said channel, substantially as set forth.

2. A nipple for nursing-bottles, provided with an exterior elastic cap, an interior tubular stopper, and a guard-shield above the cap, said guard-shield being provided with a vent-channel and with a valve at its inner end, both the valve and guard-shield being made integral with the nipple, substantially as set forth.

ANTON C. EGGERS.

Witnesses:
PAUL GOEPEL,
W. REIMHERR.